No. 762,932. PATENTED JUNE 21, 1904.
R. A. NORLING.
PORTABLE PNEUMATIC MOTOR.
APPLICATION FILED SEPT. 21, 1903.
NO MODEL. 5 SHEETS—SHEET 4.
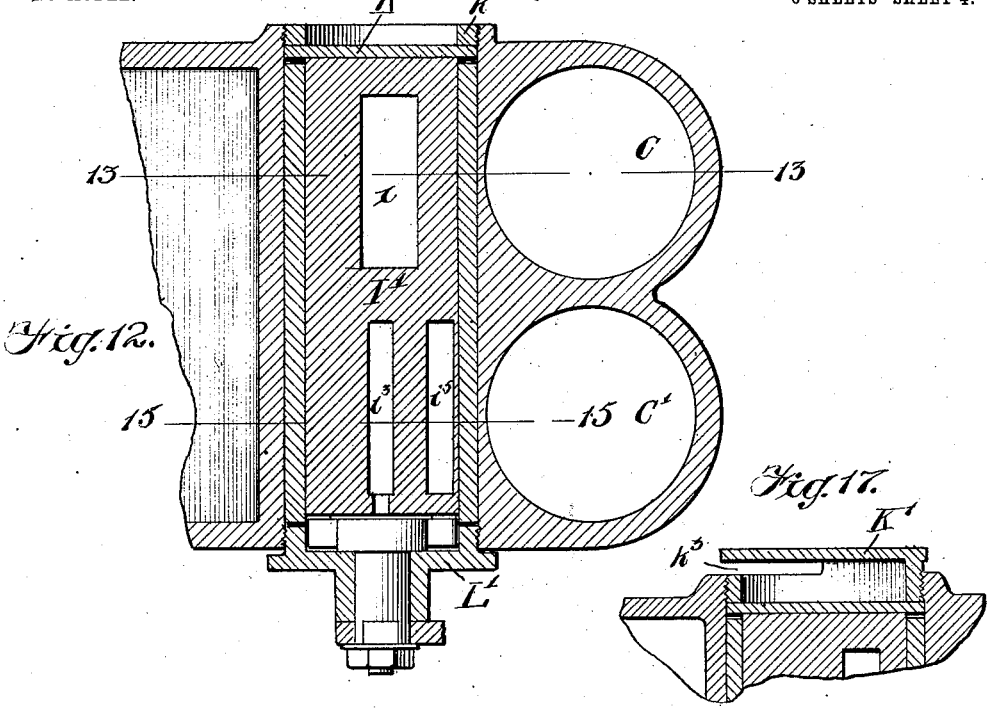
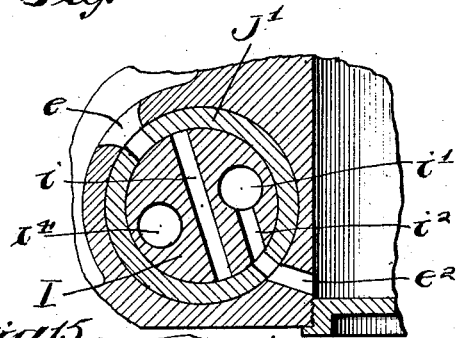
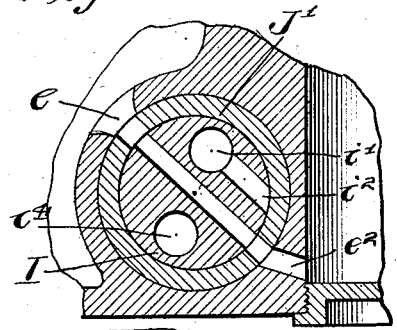
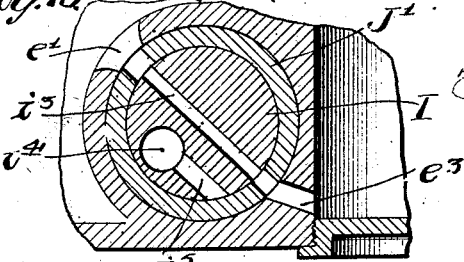
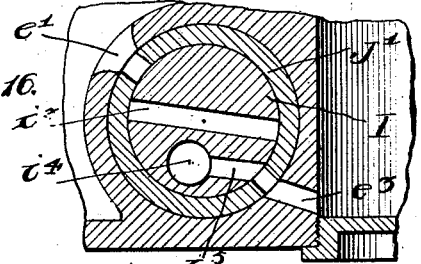
Witnesses:
Inventor:
Reinhold A. Norling
by Poole & Brown
his attorneys No. 762,932. PATENTED JUNE 21, 1904.
R. A. NORLING.
PORTABLE PNEUMATIC MOTOR.
APPLICATION FILED SEPT. 21, 1903.
NO MODEL. 5 SHEETS—SHEET 5.
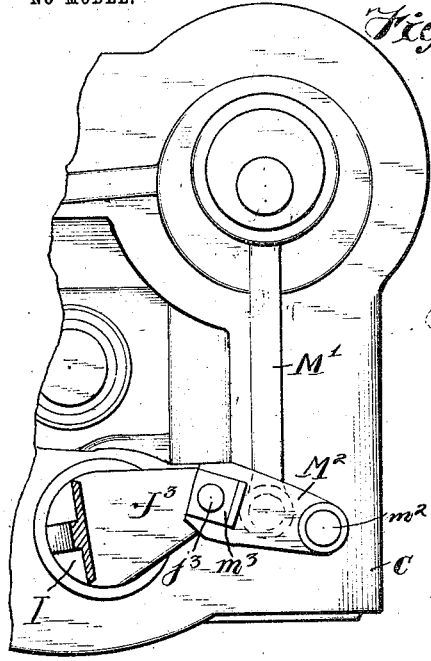
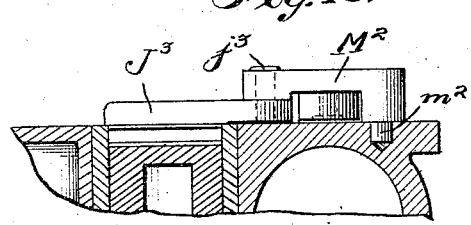
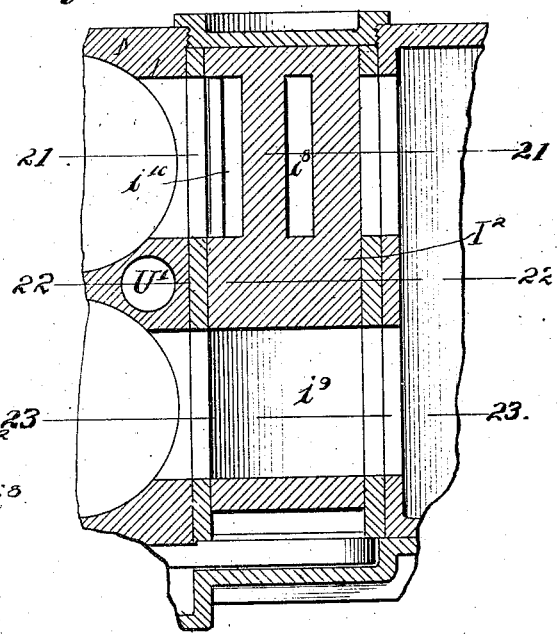
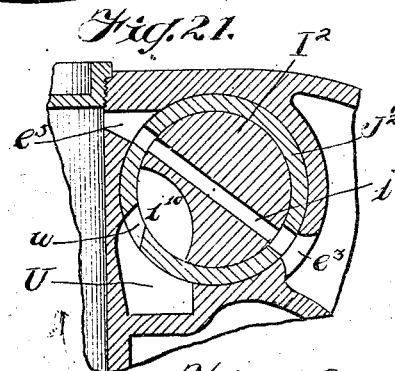
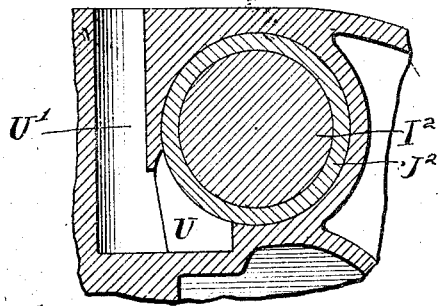
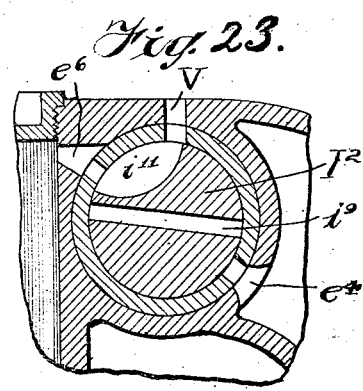
Witnesses:
Robert H. Weir
B. C. Domarus.
Inventor:
Reinhold A. Norling
by Poole + Brown
his attorneys.

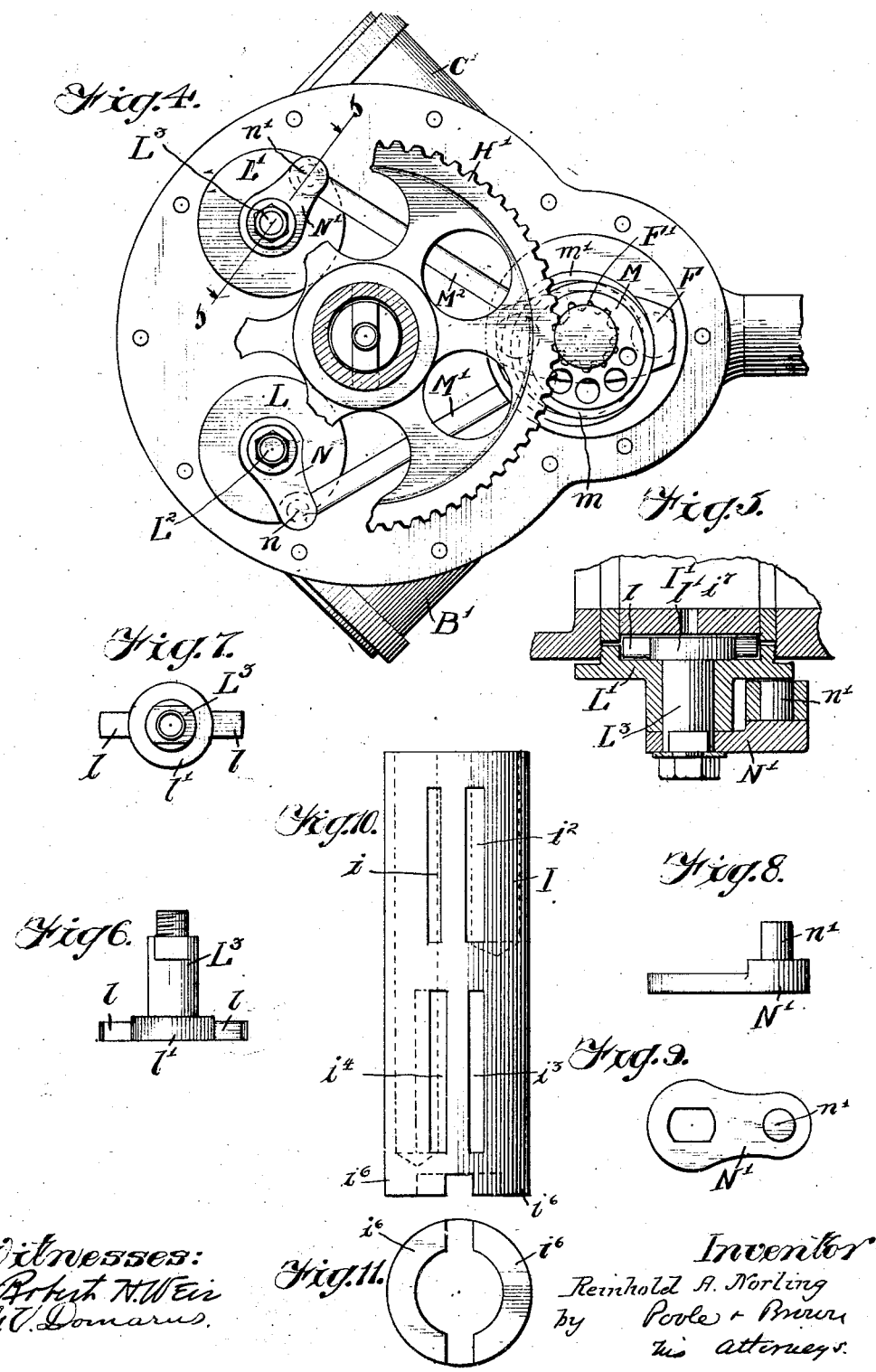

No. 762,932. Patented June 21, 1904.

UNITED STATES PATENT OFFICE.

REINHOLD A. NORLING, OF AURORA, ILLINOIS, ASSIGNOR TO AURORA AUTOMATIC MACHINERY COMPANY, OF AURORA, ILLINOIS, A CORPORATION OF ILLINOIS.

PORTABLE PNEUMATIC MOTOR.

SPECIFICATION forming part of Letters Patent No. 762,932, dated June 21, 1904.

Application filed September 21, 1903. Serial No. 173,950. (No model.)

*To all whom it may concern:*

Be it known that I, REINHOLD A. NORLING, of Aurora, in the county of Kane and State of Illinois, have invented certain new and useful Improvements in Portable Pneumatic Motors; and I do hereby declare that the following is a full, clear, and exact description thereof, reference being had to the accompanying drawings, and to the letters of reference marked thereon, which form a part of this specification.

This invention relates to improvements in pneumatic drills or mechanisms of that kind embracing a fluid-pressure engine of portable form applied to operate a drill or like tool.

My invention includes improvements in mechanisms of the kind referred to in several particulars, as will hereinafter appear.

Figure 1:
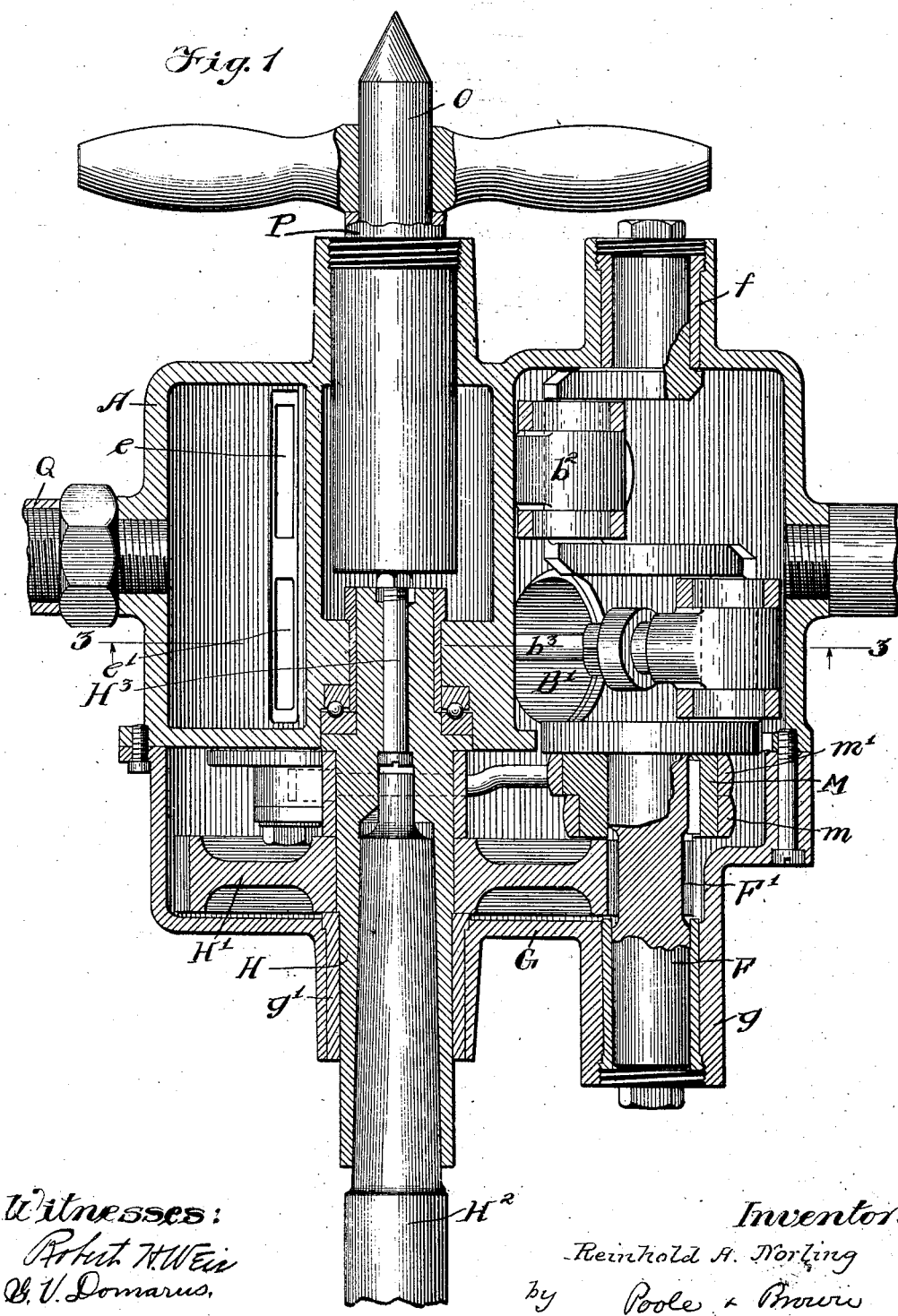
Figure 2:
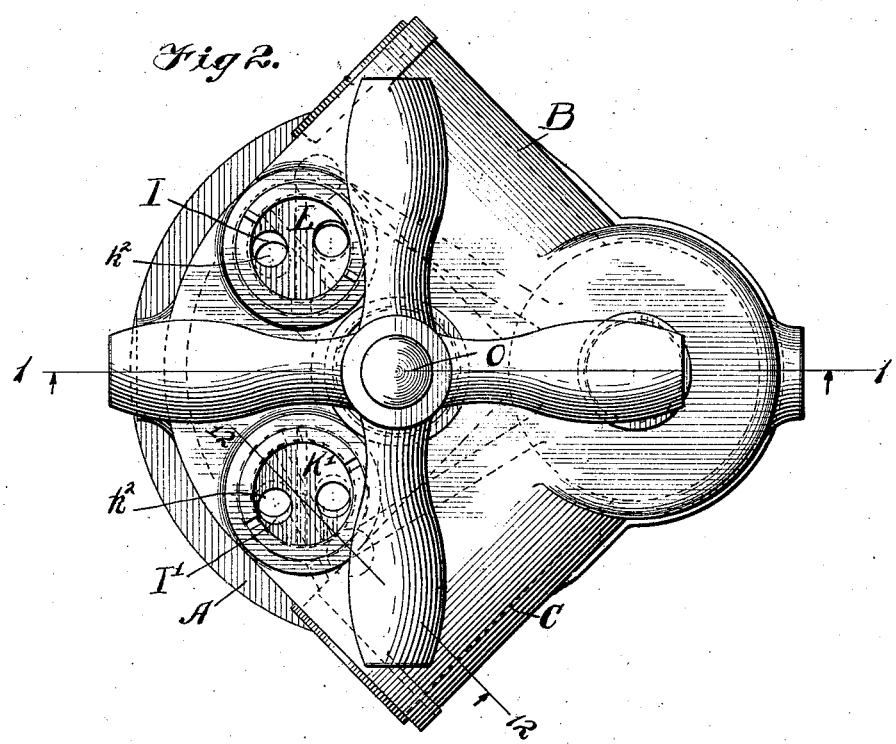
Figure 3:
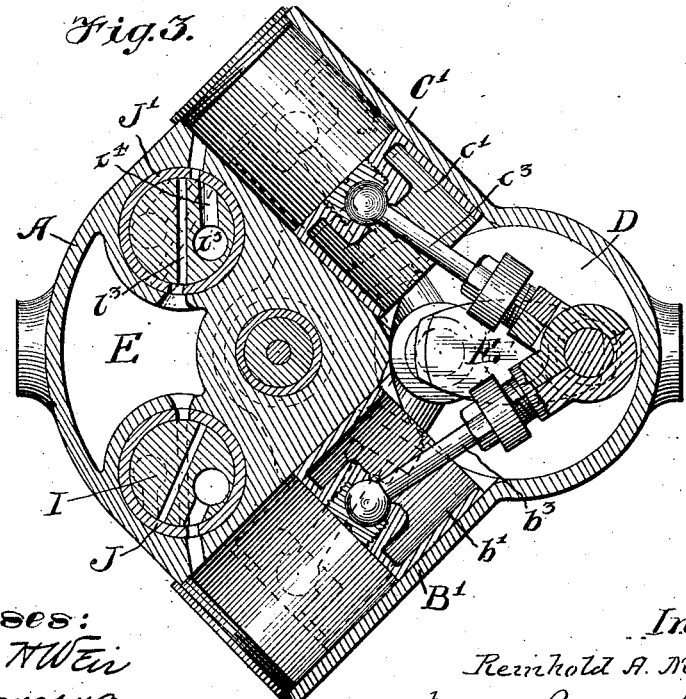

In the accompanying drawings, illustrating my invention, Figure 1 is a sectional view of a machine embodying my invention, taken through the central axis of the tool-actuating spindle thereof on the line 1 1 of Fig. 2. Fig. 2 is a top plan view of the same. Fig. 3 is a transverse section taken on line 3 3 of Fig. 1. Fig. 4 is a view showing the lower end of the main casting of the machine with the casing or housing which covers the gears there located removed and parts broken away. Fig. 5 is a detail section of the cap of one of the valve-seats, taken on line 5 5 of Fig. 4. Fig. 6 is a side view of the operating-stud through which one of the valves is actuated. Fig. 7 is an end view of the same. Fig. 8 is a side view of one of the valve-actuating arms. Fig. 9 is a face view of the same. Fig. 10 is a side view of one of the valve-plugs. Fig. 11 is an end view thereof. Fig. 12 is a sectional view taken transversely through two of the power-cylinders of the machine and through the valve-seat associated therewith on line 12 12 of Fig. 2. Fig. 13 is a detail section taken upon line 13 13 of Fig. 12. Fig. 14 is a section taken on the said line 13 13, showing a changed position of the valve. Fig. 15 is a detail section taken on line 15 15 of Fig. 12. Fig. 16 is a detail section taken on line 15 15 of Fig. 12, but showing a changed position of the valve. Fig. 17 is a sectional view showing a slotted cap applied over the exhaust end of one of the valve-plugs. Fig. 18 is a view showing a modified form of driving connection between the crank-shaft and valve-plug. Fig. 19 is a side elevation of the parts shown in Fig. 18. Fig. 20 is a section like Fig. 12, showing a modified form of the valve-plug and of the exhaust-ports in the main casing. Fig. 21 is a detail section taken on the line 21 21 of Fig. 20, but showing the valve-plug turned to the reverse position from that shown in said Fig. 20. Fig. 22 is a detail section taken upon line 22 22 of Fig. 20. Fig. 23 is a detail section taken upon line 23 23 of Fig. 20, showing the valve-plug turned into the reverse position from that shown in said Fig. 20.

As shown in said drawings, A indicates the main casing of the machine, which in general form is of sector shape and contains four power-cylinders B B' C C', a crank-chamber D, and an air-supply chamber E. The main casing A is provided at its side adjacent to the crank-shaft chamber D with a handle A', and a handle is formed on the opposite side of the casing by means of an air-supply pipe Q, which communicates with and supplies air to the chamber E. The cylinders B B' C C' are arranged in pairs, with the two cylinders constituting each pair parallel with each other and the central axes of the cylinders of each pair at right angles to the central axes of the cylinders of the other pair, the air-supply chamber E being located in the sector-shaped space between the cylinders. The pistons $b$ $b'$ $c$ $c'$ within said cylinders are connected by connecting-rods $b^2$ $b^3$ $c^2$ $c^3$ with the cranks of the crank-shaft F, which extends through the crank-chamber D. Said crank-shaft has a bearing $f$ at one end in the main casing A at one end of the crank-chamber and at its opposite end has a bearing $g$, formed in a cap or auxiliary casing G, which is secured to what may be called the "lower" face of the main casing A.

H indicates the main driving-spindle of the machine, through which motion is transmitted to the rotative tool or other part to be driven. Said spindle extends through the casing G, having a bearing $g'$ therein, and into the main casing A, and it is located centrally with respect to the two pairs of cylinders B B' and C C', as clearly seen in Fig. 2, and transversely with respect to the central axes of said cylinders. The driving-spindle H is actuated from the crank-shaft F by means of a pinion F' on the crank-shaft, which intermeshes with a spur-gear H' on the said spindle. The pinion F' is shown as formed by gear-teeth cut in the crank-shaft F, and said pinion and the gear wheels of the spur-gear H' are located outside of the main casing A, but within the auxiliary casing G, which latter covers said parts as well as the driving devices by which the valves for controlling the passage of pressure fluid to and from the cylinder are actuated, said device being located within said casing G between the said pinion and spur-gear and the adjacent face of the casing A.

A principal feature of my invention is embraced in the construction and arrangement of the valves for controlling the admission of the pressure fluid to and its escape from the power-cylinders B B' and C C'. Said valves embrace oscillating plugs or cylinders I I', which are adapted to turn in cylindric seats or chambers formed therefor in the main casing A and are arranged with their central axes or axes of rotation transverse to the cylinders B B' and C C', each of the oscillating valve-plugs being arranged to operate in connection with one pair of the cylinders. Each valve-plug and the cylindric seat therefor has two sets of coacting valve ports or passages located one set near each end of the plug and seat and opposite the cylinders with which the ports or passages constituting the sets are associated. As shown in the drawings, the valve I operates in connection with the cylinders B B' and the valve I' in connection with the cylinders C C'. The said valve-seats are formed in the casing A between the pairs of cylinders B B' and C C' and extend across the outer ends of said cylinders, the valves being interposed between the outer ends of said cylinders and the air-supply chamber E, which occupies the central space in the casing A between the said cylinders and from which the air or pressure fluid supplied by the pipe Q passes through the ports or passages of the said valves to the outer ends of said cylinders. The valve seats or chambers are shown as provided with bushings or cylindric tubular linings J J', which form the bearing-surfaces for the valve-plugs, and are provided with slots or openings which constitute the inlet and outlet ports and coöperate with the ports or passages in the valve-plugs I and I'. The ports or passages in both of the valve-plugs I I' are alike and are lettered the same in the drawings, the set of ports or passages associated with the cylinders B and C being lettered $i$ $i^2$, while that associated with cylinders B' and C' is lettered $i^3$ $i^4$ $i^5$. The sets of ports or passages formed in the casing A and the bushings J and J' are for both valves and bushings also lettered alike in the drawings and embrace ports $e$ $e$ and $e'$ $e'$, which open from the air-chamber E to the valve-seats and open into the same through slots in the bushings J J' and ports $e^2$ $e^2$ and $e^3$ $e^3$, which extend from the outer ends of the cylinders B C and B' C' to the valve-seats and likewise terminate in slots in the bushings. The ports $i$ $i^3$ extend diametrically through the valve-plug and serve to connect the outer ends of either of the cylinders with the air-chamber E when one of said passages $i$ $i^3$ is brought, by the turning of the plug, into alinement with one of the cylinder-ports $e^2$ or $e^3$ and with one of the supply-ports $e$ or $e'$. The passages $i$ $i^3$ in each plug are arranged at an angle to each other, so that when the plug is turned to bring one passage into register at its ends with two opposite ports in the casing, thereby bringing the air-supply chamber E into communication with the outer end of one of the cylinders, the other passage in the plug will be out of register with its associated supply and cylinder ports.

The exhaust-ports in the valve-plugs are formed by means of the longitudinal passages $i^2$ $i^4$ therein, which extend inwardly from the outer or upper ends of said plugs to points opposite the respective cylinders, and transverse passages $i^2$ $i^5$, which extend from the inner ends of said longitudinal passages $i^2$ $i^4$ to the side faces of the plugs and are adapted for communication with the cylinder-ports $e^2$ or $e^3$ when the valve-plugs are turned to bring said exhaust-ports into register with the said cylinder-ports. The pistons in the cylinders constituting each pair of cylinders being connected with the opposite cranks of the crank-shaft F, the valve-ports in each valve-plug are so arranged that when the pressure fluid is being admitted to one cylinder of each pair through the supply-ports $i$ $i^3$ the other cylinder of that pair will be in communication with the open air through exhaust ports or passages $i^2$ or $i^4$.

The cylindric valve seats or chambers for the valve-plugs I I' open at their ends directly through the opposite side faces of the main casing A; but at the end of said casing at which the gears F' H' are located and which is covered by the auxiliary casing G the said valve-seats are closed by means of cap-plates L L', which have screw-threaded engagement with the wall of the casing and in which are mounted short rotative valve-operating spindles $L^2$ $L^3$, through which motion is transmitted to the valve-plugs. At the opposite or upper ends of the main casing the cylindric openings constituting the valve-seats are preferably closed by means of disks K K', which are inserted in the ends of said openings over the valve-plugs and held in said openings by means of screw-threaded rings $k\ k'$, said disks K being provided with apertures $k^2\ k^2$, arranged opposite the longitudinal exhaust-passages $i''\ i''$ for the escape of exhaust-pressure fluid from the engine. Said disks K K' are made merely for the purpose of excluding dust from the bearings of the valve-plugs and to afford end bearings for the valve-plugs. The openings therein are made of proper size to permit free outward passage of exhaust-pressure fluid from the passages $i''\ i''$, notwithstanding the oscillatory movement of the valve-plugs. Said cap-plates L L' and disks K K' are arranged to bear against the ends of the bushings J and K, which are removably held in place by said caps and disks. Packing-rings or gaskets $j\ j'$ are shown as interposed between the ends of the bushings $J\ J^1$ and the cap-plates $L\ L'$ and disks K K', said packing-rings serving to insure tight joints between the parts at these points.

Actuating devices for the valve-plugs I I' are provided as follows: Upon the crank-shaft F between the pinion F' and the cranks is located a double eccentric M, Figs. 1 and 4. The eccentric parts of said double eccentric are engaged by means of the straps $m\ m'$ of two eccentric-rods $M'\ M^2$, one of which reaches to and operates the valve-plug I and the other of which reaches to and operates the valve-plug I'. Rigidly attached to the outer ends of the actuating-spindles $L^2\ L^3$ are crank-arms N N', to the outer ends of which the eccentric-rods $M'\ M^2$ are connected by means of pivot-studs $n\ n'$, Fig. 5.

A loose or flexible connection is provided between each of the actuating-spindles $L^2\ L^3$ and the valve-plugs connected therewith, Figs. 5 to 11. These devices are alike in the case of the two valve-plugs and are made as follows: The end of each valve-plug adjacent to its operating-spindle is provided with two partial or segmental endwise-projecting flanges $i^6\ i^6$, Figs. 10 and 11, between the ends of which are formed radial notches or openings adapted for engagement with radial holding-arms $l\ l$, extending outwardly from a disk or hub $l'$ on the inner end of the spindle, as clearly seen in Figs. 6 and 7. Said spindle is held from endwise movement in its bearing in the cap-plate by contact of the disk $l'$ with the inner end of said cap-plate and by the contact of the arm N or N' with the outer face of said cap-plate. The disk $l'$ is free from contact with the end of the valve-plug; but the arms $l\ l$ have close bearing contact with the ends of said flanges $i^6\ i^6$, so that while the oscillatory movement transmitted to the driving-spindles is transmitted directly to the valve-plug there is no such rigid connection between said valve-plug and said spindle as to prevent the valve-plug from maintaining its position in the surrounding seats uninfluenced by the adjustment of or any inequalities in the movement of said driving-spindle. Moreover, the pressure fluid in the supply-chamber E tends by its pressure on the adjacent side faces of the valve-plugs I and I' to press the same laterally toward the cylinder-ports, and thus maintain tight joints between the valve-plug and their seats, and it is manifest that the loose connection between the driving-spindles and the valve-plugs, provided as above described, enables the plugs to be thus pressed against their surrounding seats by the air-pressure without restriction to their engagement with the said driving-spindles. Special provision is made to insure pressure of the valve-plug laterally against the side of its seat in which the cylinder-ports are located by making the slots in the bushing J which communicate with the supply-ports $e\ e'$ wider than those which communicate with the cylinder-ports. In the end of the valve-plug adjacent to the operating-stud $J^2$ is a small air-hole $i^7$, Fig. 5, which connects the air-supply port $i^3$ with the space between the end of the valve-plug and the cap L or L'. Air under pressure is admitted through said hole $i^3$ to the space between the end of the valve-plug and the cap L or L' and serves to press the valve-plug endwise toward the exhaust end of the valve-seat, and thus hold the valve-plug in contact with the disk K and preventing leakage at that end of the valve-plug. The air-pressure thus supplied to the space at the inner face of the cap L also serves to press the operating-spindle $L^2$ or $L^3$ outwardly and hold the disk $l'$ against the cap L or L', thereby preventing leakage between the cap and spindle.

In the sectional view Fig. 3, which shows the relation of the two valve-plugs with respect to the pistons in one position of the crank-shaft, the right-hand piston has just started on its outward stroke and the valve-ports associated therewith are in position to exhaust the charge. The corresponding piston, or that in the cylinder at the same side of the casing, has just started toward the crank and the valve-ports are in position to admit the air. The left-hand piston is just completing its inward stroke and its valve-ports are in position to cut off the supply of air and will be immediately in position to exhaust the air from the cylinder. The piston in the corresponding or parallel cylinder on the left is just completing its outward stroke and the valve-ports belonging thereto are in position to close the exhaust and admit a new charge.

In Fig. 17 is shown a modified form of the check-nut by which the valve-plug is held in place in the casing at the exhaust end of the valve-plug. In this instance the said check-nut forms part of a deflector-cap adapted to prevent the exhaust from escaping directly outward or at right angles to the wall of the casing and to deflect the same in directions parallel with the said wall. In this instance said check-nut is provided with an integral disk or deflector K' and with a laterally-opening slot $k^3$, through which the exhaust escapes to the outer air. The said spindle H has in its lower or outer end a socket to receive the shank of a tool, such as is indicated by $H^2$ in Fig. 1, and the inner end of said spindle is provided with a central guide-passage $h$, which forms a continuation of the tool-holding socket and is smaller than the same. In said guide-passage is located an endwise sliding or movable tool-ejecting pin $H^3$. Said pin $H^3$ has a head at its lower end and a nut at its upper end and is adapted to project at its upper end above the inner or upper end of the spindle H, so that pressure may be brought on its said upper end for the purpose of forcing the pin endwise through the spindle against the inner end of the tool-shank held therein for the purpose of loosening or dislodging the same.

In the casing A, in axial alinement with the tool-carrying spindle H, is arranged a feed-screw spindle O, provided with four radial handles, by which it may be turned. The drawing Fig. 1 shows a sleeve P, attached to the casing, with which the feed-screw spindle O has screw-threaded engagement; but these parts are not shown in detail in the accompanying drawings, as they form no part of the present invention.

In Figs. 18 and 19 are shown a somewhat different form of construction in devices for communicating motion from the eccentrics on the main crank-shaft to the valve-plug for the purpose of giving reciprocatory motion to the same. In this instance the valve-plug is provided with an actuating-arm $J^3$, which is rigidly attached to the end of the plug and the body of which is made of disk form, so as to cover or close the adjacent end of the valve seat or chamber. The eccentric-rod M' in this instance is not directly connected with the actuating-arm of the valve-plug, but is pivoted to a rocker-arm $M^2$, which is mounted on a pivot-stud $m^2$, affixed in the wall of the casing, and said rocker-arm has engagement with the actuating-arm $J^3$ of the valve-plug by means of a longitudinal slot in the end of the rocker-arm, which slot is engaged by a sliding block $m^3$, adapted to slide in said slot longitudinally of the rocker-arm and which is engaged by a wrist-pin $j^6$, secured in the end of the actuating-arm. In this instance the arm $J^3$ is connected with the valve-plug I by means of a transverse groove in the end of the valve-plug, which is engaged by a rib on the adjacent face of the arm.

While the valve-plug provided with longitudinal exhaust-passages opening through the ends of the plugs has advantages in point of simplicity and cheapness of construction, yet valves arranged relatively to the cylinders and crank-shaft in the same manner, as hereinbefore set forth, may have exhaust-passages otherwise arranged, as in the casing itself. A construction in which exhaust-passages in the casing operate in connection with short transverse ports or recesses in the plugs is shown in Figs. 20 to 23 of the accompanying drawings. As illustrated in said figures, $I^2$ indicates a valve-plug like the valve-plugs I and I', above described, with the exception that the valve-plug $I^2$ has two transverse admission-ports $i^8$ and $i^9$ and two exhaust-passages $i^{10} i^{11}$, which latter have the form of transverse recesses in the side of the plug. The ports $i^8$ and recess $i^{10}$ for the uppermost cylinder operate, in connection with a supply-port $e^3$, a cylinder-port $e^5$, and an exhaust-port $u$ opens into a chamber U, formed in the casing, which chamber U extends lengthwise of the valve-chamber outside of the bushing to a point between the cylinders, where it is connected with the inner end of a passage U', which extends longitudinally of the cylinders between the same and the valve-chamber, Fig. 22, and opens through the outer wall of the casing at the outer ends of the cylinders. The recess $i^{10}$, Fig. 21, is wide enough to extend over or embrace both the ports $e^5$ and $u$, so that when the valve-plug is turned to the proper position the exhaust passes from the cylinder through the port $e^5$, the recesses $i^{10}$, and port $u$ to the cylinder U and thence to the outer air through the passage U'. In the case of the port $i^9$ and recess $i^{11}$ for the lower cylinder the casing is provided with an exhaust-passage V, extending from the inner face of the valve-chamber outwardly through the casing-wall. The recess $i^{11}$ is made of proper width to embrace the cylinder-port $e^6$ and said passage V, so that when the plug is in proper position the exhaust passes from the cylinder through the port $e^6$ and recess $i^{11}$ to said exit-port V. It will of course be understood that in this case the two sets of ports in the plug are so arranged that when the admission-port $i^8$ is in position to admit pressure to the upper cylinder the recess $i^{11}$ will be in position to permit the exhaust to pass from the lower cylinder and that when the port $i^9$ is in position to admit pressure to the lower cylinder the recess $i^{10}$ of the plug will be in position to permit escape of the exhaust from the upper cylinder through the chamber U and passage U'.

An important advantage gained by the general arrangement of the valves above described—to wit, one in which the supply-chamber for the compressed air or pressure fluid is located between the sets of cylinders and the plug-valve which operates in connection with each set extends transversely of the cylinders and has a set of ports for each cylinder arranged opposite the cylinder to which it belongs—is that the passages leading from the supply-chamber to the valves and from the valves to the cylinders are thereby made very short, being in the case of the passage from the supply-chamber to the valves merely slots or openings in the walls of the valve-chambers which separate the latter from the supply-cylinder.

I claim as my invention—

1. A portable pneumatic motor comprising a plurality of sets of power-cylinders, arranged at an angle to each other, pistons in said cylinders, a crank-shaft with which the said pistons are connected, the cylinders of each set being parallel with each other and having their central axes in a plane which is radial with respect to the axis of the crank-shaft, valves for said cylinders embracing rotative valve-plugs the central axes of which are parallel with the axis of the crank-shaft and each of which is common to all of the cylinders of one set of cylinders, and operative connections between the crank-shaft and said valve-plugs for actuating the latter.

2. A portable pneumatic motor comprising a plurality of sets of power-cylinders arranged at an angle to each other, pistons in said cylinders and a crank-shaft with which the said pistons are connected, the cylinders of each set being parallel with each other and having their central axes in a plane which is radial to the axis of the crank-shaft, and rotative valves, embracing valve-plugs, the central axes of which are parallel with the axis of the crank-shaft and each of which is common to all of the cylinders of one set of cylinders, said valve-plugs each having a plurality of sets of valve ports or passages, one set for each cylinder of its associated set of cylinders, and operative connections between the crank-shaft and the said valve-plugs for giving motion to the latter.

3. A portable pneumatic motor comprising a casing which is provided with a plurality of sets of power-cylinders arranged at an angle to each other, a supply-chamber for the pressure fluid, and valve-chambers interposed between said supply-chamber and the said sets of power-cylinders, the cylinders of each set having their central axes parallel with each other and in a plane which is radial to the axis of the crank-shaft, rotative plug-valves located in said valve-chambers, each of which is common to all of the cylinders of one set of cylinders and the central axes of which are parallel with the axis of the crank-shaft, said plug-valves each having a plurality of sets of valve ports or passages, one for each cylinder of its associated set of cylinders, and operative connections between the crank-shaft and the said valve-plugs for giving motion to the latter.

4. A portable pneumatic motor comprising a casing provided with a plurality of sets of power-cylinders, pistons in said cylinders and a crank-shaft with which said pistons are connected, the cylinders of the several sets having their central axes in planes which are radial with respect to the axis of the crank-shaft and are at an angle to each other, said casing being also provided between the outer ends of the cylinders, with a supply-chamber for the pressure fluid, located between the outer ends of said cylinder and also having, between said supply-chamber and the cylinders, cylindric valve-chambers the central axes of which are at right angles to the axes of the cylinders and parallel with the crank-shaft, rotative valve-plugs located in said chambers, said valve-plugs each having a plurality of sets of valve ports or passages, one for each of the cylinders associated therewith, and the valve-casings having ports or passages leading from the said supply-chamber to the said valve-chambers and connections between the crank-shaft and the said valve-plugs for giving motion to the latter.

5. A portable pneumatic motor comprising a casing which is provided with a plurality of sets of power-cylinders, pistons in said cylinders, and a crank-shaft with which the said pistons are connected, the cylinders of the several sets having their central axes in planes which are radial to the axis of the crank-shaft and are at an angle to each other, rotative valve-plugs which are common to all of the cylinders of one set, and the central axes of which are parallel with the axis of the crank-shaft, said valves each having a plurality of sets of valve ports or passages one for each cylinder of the associated set of cylinders, eccentrics on the said crank-shaft, actuating-arms on said valve-plugs, and means connecting said eccentrics with said arms for giving oscillatory motion to the valve-plugs.

6. A portable pneumatic motor comprising a casing provided with a power-cylinder and a pressure-fluid-supply chamber, a crank-shaft, a piston in the cylinder connected with the crank-shaft, an oscillatory valve-plug mounted in the casing parallel with the crank-shaft, and a valve-chamber for said plug-valve, the wall of which constitutes part of the wall of the said supply-chamber, said chamber being provided with a port or opening connecting the same with said supply-chamber, and with another port or opening connecting the same with the cylinder, and the valve-plug being provided with an admission and an exhaust port, said admission-port being adapted to communicate with both of said ports or openings in the valve-casing.

7. A portable pneumatic motor comprising a crank-shaft, a power-cylinder, a valve for controlling the admission of pressure fluid to and its exit from said cylinder, said valve embracing a rotative valve-plug the axis of which is at right angles to the central axis of the cylinder and parallel with the crank-shaft, an admission-port in said valve-plug through which pressure fluid is admitted to the outer end of the cylinder and an exhaust-port in said plug connected with an exhaust-passage which extends longitudinally through the plug and opens through one end of the same.

8. A portable pneumatic motor comprising a plurality of sets of power-cylinders arranged at an angle to each other, pistons in said cylinders, a crank-shaft with which said pistons are connected; the cylinder of each set being parallel with each other and having their central axes in a plane which is radial to the axis of the crank-shaft, and rotative plug-valves arranged with their axes parallel with the crank-shaft, each of said valves having a valve-plug provided with two sets of ports, one for each of its associated cylinders, each of which said sets of ports consisting of an admission-port which extends transversely of the plug, and an exhaust-port which is connected with an exhaust-passage which extends longitudinally through the plug and opens through one end of the same.

9. A casing for a portable pneumatic motor provided with two sets of parallel cylinders arranged at right angles to each other, a crank-chamber located at the adjacent ends of the cylinders, a pressure-fluid-supply chamber located between the cylinders, two valve-chambers which extend at right angles to the axes of the said cylinders between the latter and the said supply-chamber, and rotative valve-plugs in said valve-chambers, said casing having two parallel walls which extend between the two sets of cylinders and form the end walls of said supply-chamber and the walls of the valve-chamber being joined at their ends to said end walls and the said valve-chambers opening at their ends through said end walls.

10. A portable pneumatic motor comprising a main casing provided with two sets of parallel cylinders arranged at an angle to each other and with a supply-chamber located between the cylinders, a crank-shaft, pistons in the cylinders connected with the crank-shaft, oscillatory valve-plugs mounted in the casing parallel with the crank-shaft between the said supply-chambers and the cylinders, and actuating means for the said valve-plugs embracing eccentrics on the crank-shaft, actuating-arms mounted in the casing and connected with the valve-plugs, and operative connections between the said eccentrics and the said actuating-arms.

In testimony that I claim the foregoing as my invention I affix my signature, in presence of two witnesses, this 9th day of September, A. D. 1903.

REINHOLD A. NORLING.

Witnesses:
   C. E. ERIKSON,
   HARRY J. BETTENDORF.